United States Patent
Balser et al.

[11] 3,735,333
[45] May 22, 1973

[54] AIRCRAFT VORTEX DETECTION SYSTEM

[75] Inventors: Martin Balser, Covina; Arthur E. Nagy, Los Angeles; Andrew P. Proudian, Chatsworth, all of Calif.

[73] Assignee: Xonics Inc., Van Nuys, Calif.

[22] Filed: Dec. 23, 1971

[21] Appl. No.: 211,478

[52] U.S. Cl. .................340/1 R, 340/3 D, 343/5 W
[51] Int. Cl. ............................................G01s 9/66
[58] Field of Search ............................340/1 R, 3 D; 343/5 W

[56] References Cited
UNITED STATES PATENTS
3,028,578  4/1962  Stanton..................................340/1 R Primary Examiner—Richard A. Farley
Attorney—Ford W. Harris, Jr., Warren L. Kern, Walton Eugene Tinsley et al.

[57] ABSTRACT

An improved system for detection and measurement of aircraft wing tip vortices over a wide area. An acoustic echo system with transmitter and receiver spaced from each other in a plane perpendicular to the flight path for illuminating the vortex and picking up scattering of the transmitter signal produced by the vortex, using Doppler frequency spectrum analysis with the maximum and minimum frequencies providing a measure of vortex intensity. A plurality of receivers operating with a common transmitter providing coverage of an area of interest along a flight path. A transmitter covering a broad area by a broad beam acoustic transducer or a plurality of narrow beams, and means for identifying a specific zone within the broad area occupied by the vortex being analyzed.

12 Claims, 10 Drawing Figures

PATENTED MAY 22 1973 3,735,333

AIRCRAFT VORTEX DETECTION SYSTEM

This invention relates to a new and improved system for the remote detection and measurement of vortices produced by aircraft in flight. A pair of counter-circulating wind funnels or vortices are formed behind the tips of the wing of an aircraft in flight due to the lift generated by the wing. These vortices are often referred to as the tip vortices or wing-tip vortices.

The vortices shed by large aircraft constitute a hazard to smaller trailing aircraft. Controlled tests have shown that such vortices produce large rolling movements in aircraft flying through them at distances up to five miles behind the generating aircraft. The movement and decay of such vortices are variable, depending on the type of generating craft and on atmospheric conditions, and are not sufficiently predictable to provide reliable information to the pilot of a trailing aircraft as to when a vortex constitutes a potential threat to his aircraft so that he may take the proper precautionary action. The problem is particularly acute near and around airports where the aircraft traffic density is high and where the low flight altitudes make loss of control more hazardous. It should be noted that aircraft operation around an airport with separation maintained so great that preceding aircraft vortices can safely be assumed to have dissipated is not consistent with normal high-density airport operation requirements.

It is therefore highly desirable to have a system that can detect and locate wing tip vortices and determine their strength, so as to permit avoidance of severe vortices by trailing aircraft vulnerable to them. One system for detecting vortices is disclosed in the copending application Ser. No. 97,765, filed Dec. 14, 1970, now U.S. Pat. No. 3,671,927, issued June 20, 1972 and assigned to the same assignee as this application.

The system of this copending application incorporates an acoustic Doppler radar or echo system providing an aircraft vortex remote detection system which can monitor the air space near and around airports and provide information for pilot and/or control tower personnel on the location and severity of vortices. The information provided by the system on vortex intensity and location can be used in the control of trailing aircraft and in the study of vortex development and structure.

This earlier system employed a single, relatively narrow transmitter beam, which in conjunction with a number of receiver beams provided coverage of a sequence of adjacent common scattering zones or resolution cells. The present invention provides certain improvements in the earlier system that allow an acoustic echo system to cover a large area, rather than the relatively narrow swath obtained in the prior system. An acoustic system places special requirements on the echo system design as compared to standard radar systems, inasmuch as the long time of travel of the acoustic signal from transmitter to receiver may lead to a condition of "overspread" signals. The difference in path length between the longest path and the shortest path between transmitter and receiver may be many hundreds of feet, corresponding to a difference in path delay of the order of half a second. The fluctuations in the signal scattered from vortex activity would have a bandwidth typically of one to several hundred Hertz. The time-bandwidth product is thus very much greater than unity, leading to some difficulty in analyzing the scattering medium with conventional radar modulations.

The present invention utilizes the plurality of receivers and analyzers of the system of the copending application in combination with a transmitter acoustic transducer system for directing energy over a broad area encompassing a substantial length of the beam path of each of the receivers. The system of the present invention also provides a spatial identification of the particular zone in the area illuminated by the transmitter which is occupied by the vortex producing the receiver output signal; one embodiment utilizes a plurality of adjacent narrow beams at the transmitter, and another embodiment utilizes a single broad beam. Accordingly, it is an object of the invention to provide such a new and improved aircraft vortex detection system. While the term "acoustic transducer" is used in the specification and claims, it should be noted that the term "antenna" is sometimes used in referring to an acoustic transducer.

Other objects, advantages, features and results will more fully appear in the course of the following description. The drawings merely show and the description merely describes preferred embodiments of the present invention which are given by way of illustration or example.

Figure 1:
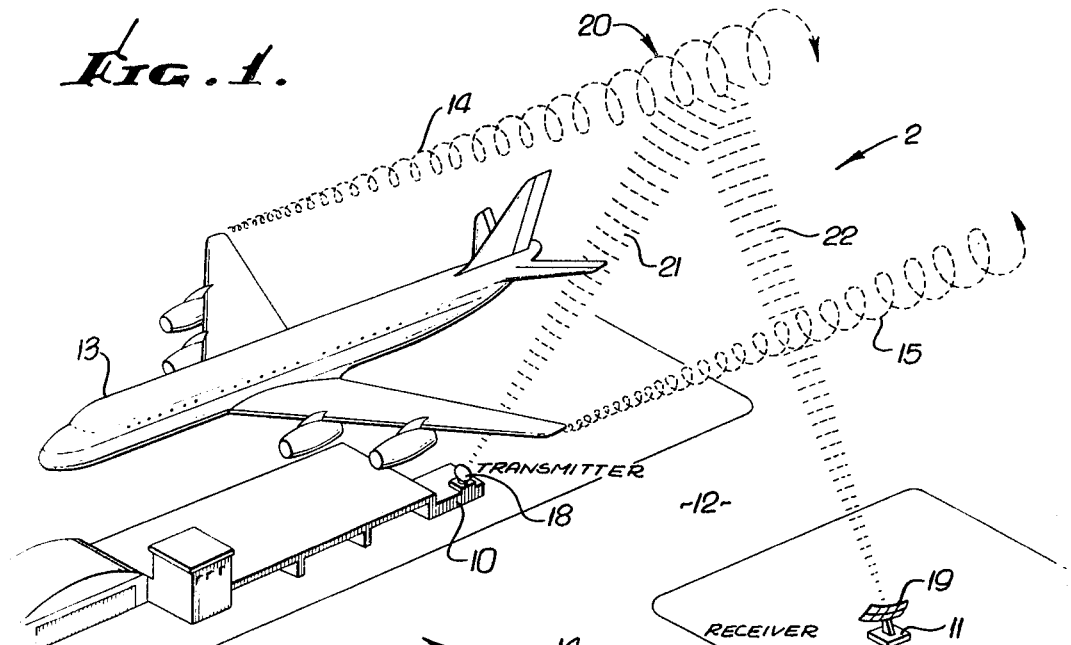
FIG. 1 is a perspective view illustrating a vortex detection installation at an airport.

Referring to the basic system as shown in FIG. 1, a transmitter 10 and a receiver 11 are positioned at an airport, typically on opposite sides of a runway 12. An aircraft 13 in flight generates counter-rotating vortices 14, 15 at the tips of the wing. The transmitter and receiver are operated in the acoustic frequency range to provide an acoustic echo system, with the transmitter acoustic transducer 18 and the receiver antenna 19 directed to a zone indicated generally at 20.

The transmitter directs a beam 21 of acoustic energy to the zone 20. When there is a vortex in this zone, the energy from the transmitter is scattered and portions thereof, indicated by the beam 22, are picked up by the receiver. The reception of this scattered energy from the transmitter indicates the existence of a vortex in the zone 20. The ground locations of the transmitter and receiver and the axes of the beams 21, 22 provide the location for the zone. The receiver output may be processed to provide a signal indicative of the intensity of the vortex detected in the zone.

Acoustic echo systems typically are operated in the frequency range up to about 10 khz and in the system of the present invention, it is preferred to operate in the range of about 2 to 6 khz. The acoustic echo system in the vortex detection system is operated as a bistatic Doppler system.

Figure 2:
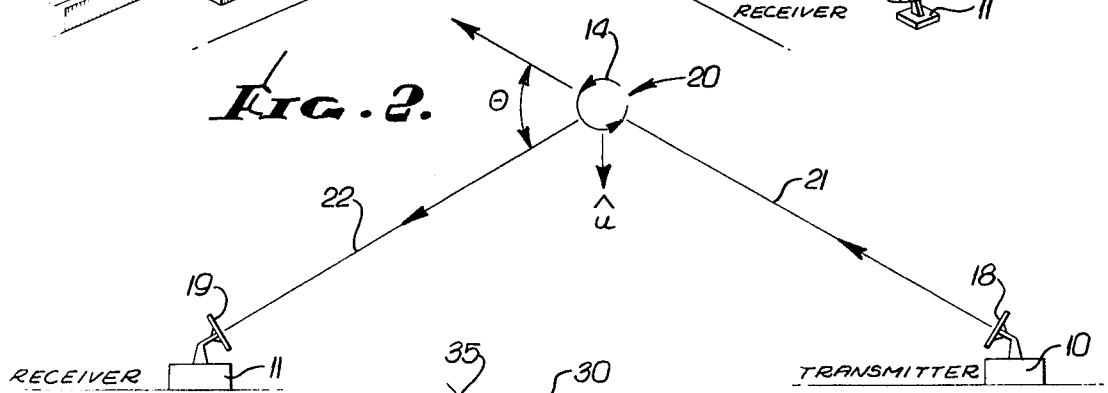
FIG. 2 is a view illustrating the operation of the system of FIG. 1 and looking along the flight path as indicated by the arrow 2.

The basic mode of operation of the acoustic Doppler vortex detection system is therefore to transmit an acoustic wave of frequency $f$ and to detect the presence of a vortex in the beam path by detecting the acoustic wave scattered from the vortex by the velocity fluctuations within it. One measure of the intensity of the vortex can be determined from the Doppler frequency spectrum of the scattered signal, as follows: The velocity v corresponding to a given Doppler shift frequency $f_d$ is given by the relation $$f_d = 2 f (v/c) \sin (\theta/2)$$

where
$f$ = transmitted frequency,
$v$ = velocity of scattering element in the direction $u$ bisecting the angle between the incident and scattered wave vectors,
$c$ = speed of sound in air, and
$\theta$ = scattering angle (see FIG. 2).

Figure 3:
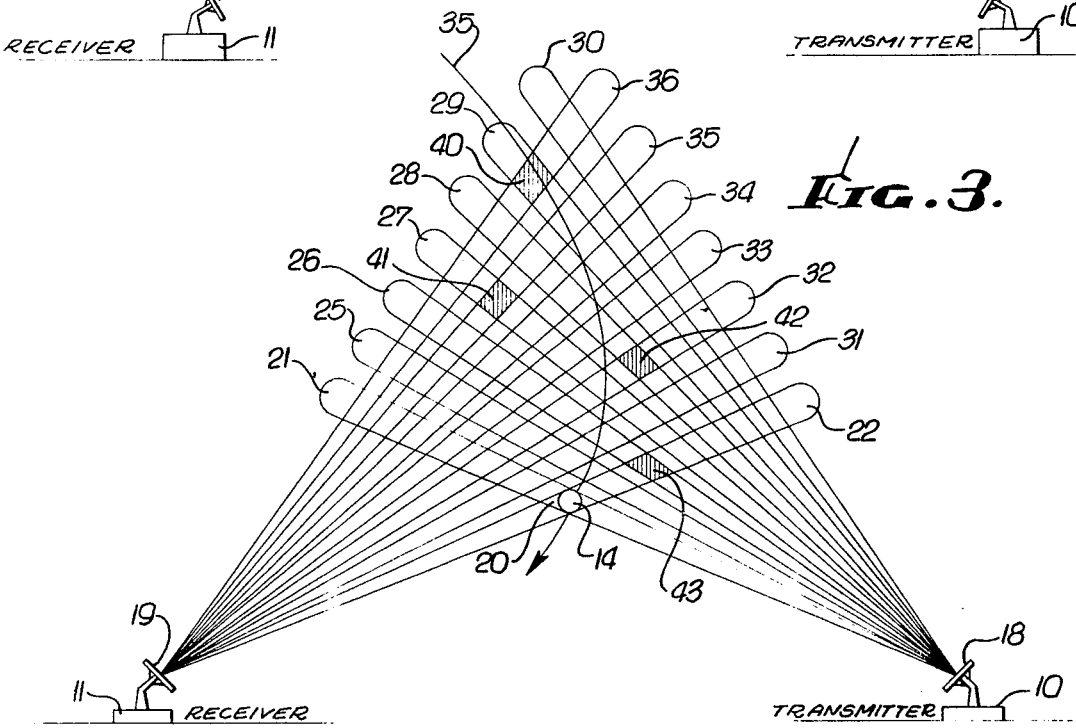
FIG. 3 is a view similar to that of FIG. 2 illustrating a vortex detection system incorporating a presently preferred embodiment of the invention.

The preferred configuration of the system is one in which the incident wave vector (as determined by the transmitted beam 21 direction) and the scattered wave vector (determined by the receiver beam 22 direction) are such that the direction $u$ is substantially normal to the vortex axis (i.e., to the generating aircraft flight path), so that the Doppler spectrum of the received signal is affected primarily by the tangential wind velocities in the vortex. This may be achieved by positioning the transmitter and receiver so that the transmitter, the receiver and the zone of interest 20 lie in a plane generally perpendicular to the aircraft flight path. The maximum (positive and negative) Doppler shifts of the scattered signal will then be determined primarily by the maximum tangential velocity $v_{max}$ present in the vortex. The system of FIG. 3 incorporates the multiple beam receiver configuration of the copending application in combination with a multiple beam transmitter. In the preferred embodiment, a phased array of acoustic transducer elements is used to produce the individual narrow beams, each of which is equivalent to a single transmitter beam such as the beam 21 of FIG. 2. In the embodiment of FIG. 3, the transmitter provides beams 21 and 25–30 and the receiver provides beams 22 and 31–36. Each area of intersection of a transmitter and a receiver beam provides a specifically located zone, such as the zones 40, 41, 42, 43. The transmitter provides for illuminating each of the zones and the receiver provides for picking up scattering from each of the zones as produced by a vortex in a zone, such as the vortex 14 in the zone provided by the intersection of transmitter beam 21 and receiver beam 22.

The multiple beams may be achieved by utilizing a separate acoustic transducer for each beam or by utilizing a single acoustic transducer array with electronic or mechanical scanning.

In a typical system, the transmitting and receiving acoustic transducers consist of arrays of transmitting and receiving elements, thereby permitting electronic scanning and the simultaneous formation of multiple beams. The signal normally is transmitted at one or more frequencies, and the received signal in each receiver channel is fed to a spectrum analyzer with a non-coherent integrator and suitable displays. Information about the location of the vortex is contained in the known angular positions of the transmitter and receiver beams. Information about the intensity of mean and turbulent winds in the vortex is contained in the frequency shift and spreading of the received signal.

Referring again to FIG. 3, in the operation of the bistatic acoustic echo system, the acoustic beams 21, 25–30 are formed by a transmitting antenna 18. A set of beams, seven in the embodiment illustrated in FIG. 3, comprising 22, 31–36, is formed by an array receiving acoustic transducer, indicated at 19, separated from the transmitter by a distance of the order of 300 meters. When a turbulent disturbance such as the vortex 14 is introduced into one of these zones, such as zone 20, energy is scattered out of the transmitted beam 21 into the receiver beam 22 intersecting that zone, and is fed into the receiver channel appropriate to that beam. The disturbance, the vortex 14 caused by the airplane 13 that has passed overhead a short time earlier, is shown as descending through zone 20 along the vortex trajectory 35.

Means are provided for distinguishing the different transmitter beams to provide the spatial identification of the zone in which a vortex is detected. In one of the distinguishing or identification means, time sharing is utilized, that is, each transmitter beam is energized in sequence with a continuous wave signal for a short period. When an output signal is obtained for a particular receiver beam, it is known which transmitter beam is being energized and therefore the zone of interest is at the intersection of these specific transmitter and receiver beams. A typical system would utilize in the order of six to 12 transmitter beams. It is normally desirable to maintain the transmitter scanning time to a value of no more than about 2 seconds and also to dwell on each beam a sufficiently long time to achieve the desired analysis, usually requiring one-quarter to one-half second.

These time factors place some limitation on the number of beams which can be scanned. This problem may be resolved by transmitting on separate transmitter beams simultaneously at different frequencies. The bandwidth of the vortex return normally requires a separation of a kilohertz or so between channels. At the same time it is desirable to have the scattering returns to the various channels of the receiver comparable in frequency and bandwidth, and this usually indicates that the number of simultaneous frequencies at the transmitter be not more than two or three.

Figure 4:
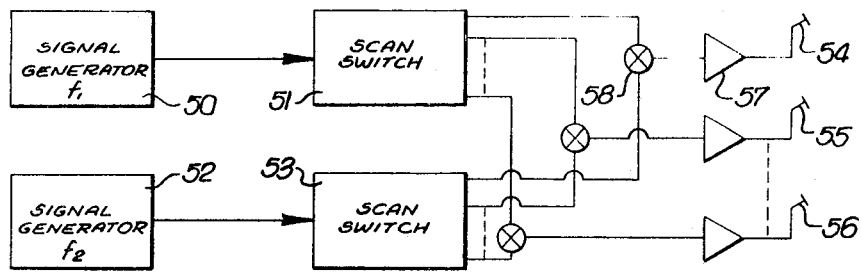
FIG. 4 is a block diagram of a transmitter suitable for use with the system of FIG. 3.

A transmitter configuration for selectively energizing a plurality of adjacent transmitter beams by scanning and operation at two frequencies $f_1$ and $f_2$ is shown in FIG. 4. The output of a signal generator 50 is connected to a scan switch 51 and the output of a signal generator 52 is connected to a scan switch 53. The signal generators operate at the basic transmitting frequencies, typically 5 Khz and 6 Khz. The transmitter may utilize a plurality of acoustic transducers, with three 54, 55, 56 shown in FIG. 4. The frequency $f_1$ is sequentially connected to each of the acoustic transducers through a power amplifier 57 and a summing junction 58 by the scan switch 51. The frequency $f_2$ is similarly sequentially connected to each of the acoustic transducers via the summing junctions and power amplifiers by the scan switch 53.

Figure 5:
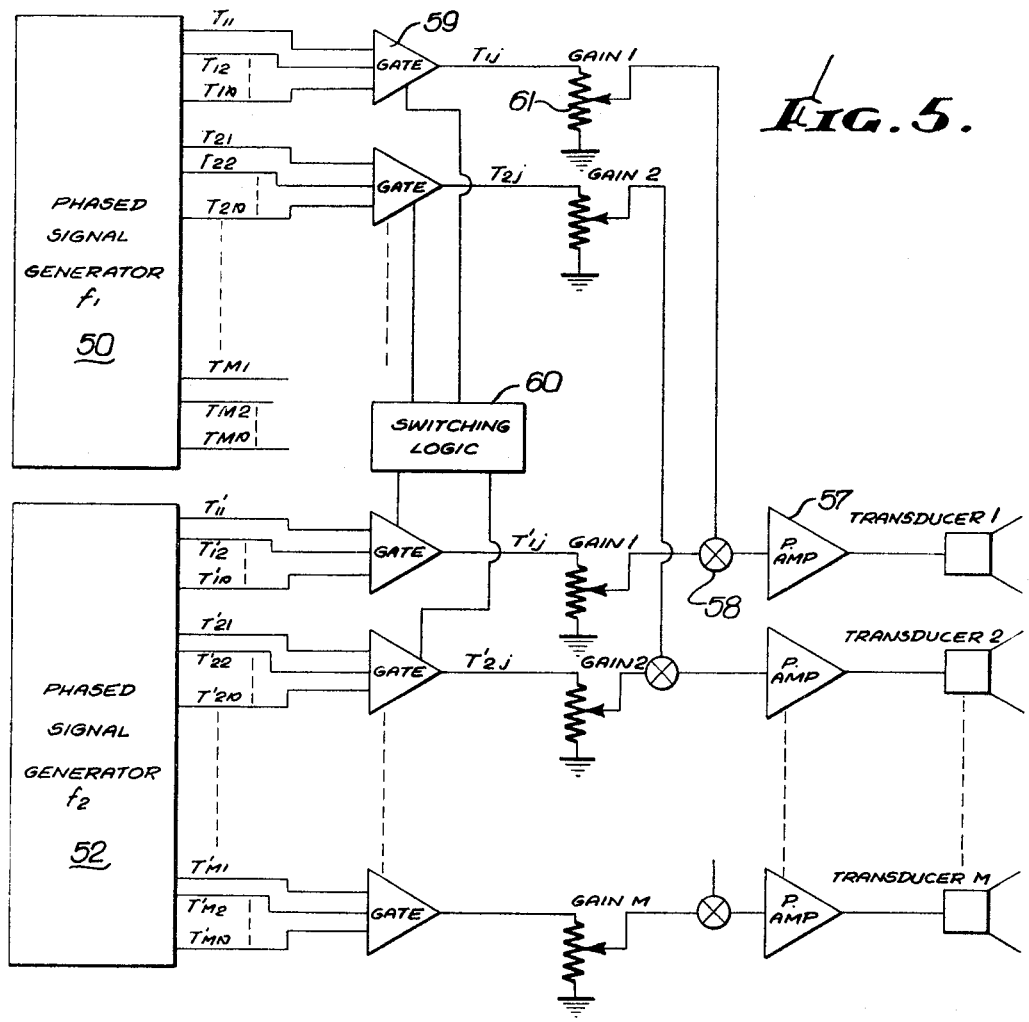
FIG. 5 is a schematic diagram illustrating the transmitter of FIG. 4 in greater detail.

A specific embodiment for the transmitter of FIG. 4 utilizing a phased array for the acoustic transducer comprising a plurality of acoustic transducers 1-M as the acoustic transducer elements is shown in FIG. 5.

The first step in producing the transmitter beams is to generate a set of signals with appropriate time delays or phasing so as to produce a properly phased set of signals for the radiating elements or transducers. These are produced by the phased signal generators 50, 52. Scanning is provided by gates 59 under the control of switching logic 60, with a gate for each transducer at each frequency. Gain control is provided for the output of each gate by a potentiometer 61.

The array of the transmitter of FIG. 5 utilizes M transducers to produce N beams. The output $T_{11}$ is the properly delayed signal for transducer 1 to produce transmitter beam 1. Similarly, output $T_{12}$ is the properly delayed signal for transducer 1 to produce beam 2, and so on for each of the N beams. Similarly, outputs $T_{21}$–$T_{2N}$ provide the signals to transducer 2 for each of the N beams. There are M sets of outputs from a signal generator for the M transducers of the array. Dual frequency operation is obtained by utilizing two generators 50, 52 with corresponding gates and gain control, all under the control of the switching logic 60. The switching logic cycles through the proper delays for each successive beam position by activating the appropriate gates utilizing conventional acoustic transducer scanning techniques. Any type of aperture illumination taper can be easily obtained by adjusting the gain of each power amplifier. One embodiment in current use incorporates an array of 22 transducer elements, phased to produce four sets of two simultaneous beams at different frequencies, providing a total of eight beams.

Several techniques are available for implementing the phased signal generators 50, 52. One consists of a delay line with taps at about 100 equal increments, from which the delay appropriate to a given beam and a given element is selected when required. Use of time delays produces a beam position that is independent of frequency. If the frequency need not be varied, the delay need only produce the proper phase for that frequency, and lines can generally be made shorter and with fewer taps. In this case the maximum delay $T_{max} = 1/f$, or even $T_{max} = \frac{1}{2}f$ if some output signals are inverted.

An alternate technique for generating the properly phased signals utilizes a shift register as a substitute for the delay line. Assume that the register contains N bits, initially all the same state. Let the register be shifted at a frequency of $2Nf$, with the least significant bit being inverted and fed into the most significant bit when the register is given the shift command. As a result, a square wave appears at the Mth register cell, which has a frequency $f$ and a phase $2\pi M/N$, or $2\pi M/N + \pi$ if the output is inverted. The square wave can then be low-pass filtered to produce only the fundamental frequency $f$, and fed into its appropriate gate.

A third phasing technique is based on the reciprocity principle. A sound source is placed in the far field of the acoustic transducer at the desired angle for each beam. If the acoustic transducer is used as a receiver, signals of the appropriate phase for that direction appear at the element terminals. These signals are then recorded by an appropriate means. With proper editing, beam switching can then be programmed and the recordings played back through amplifiers to generate the proper beams.

With the system of FIG. 5, the switching logic provides identification of the transmitter beam being energized at any time for each frequency $f_1, f_2$. Hence when there is a receiver output indication for one of the frequencies, $f_1, f_2$, at a particular time, the particular transmitter beam producing energy for scattering to the particular receiver beam by the vortex is identified and the known spatial intersection of the two beams locates the vortex.

A separate receiver channel is provided for each of the receiving beams, and suitable receiver and analyzer channels are shown and described in the aforesaid copending application. Reference may be made to said application for specific examples of operating characteristics.

Figure 7:
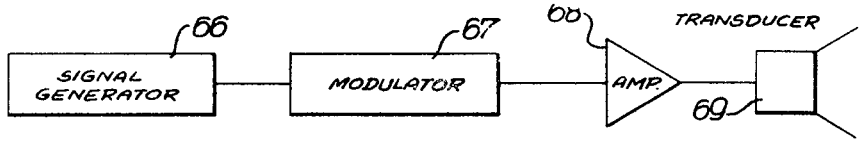
FIG. 7 is a block diagram of a transmitter suitable for use with the system of FIG. 6.
Figure 8:
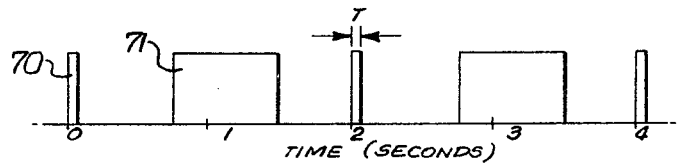
FIG. 8 illustrates the pulse output of the transmitter of FIG. 7.
Figure 6:
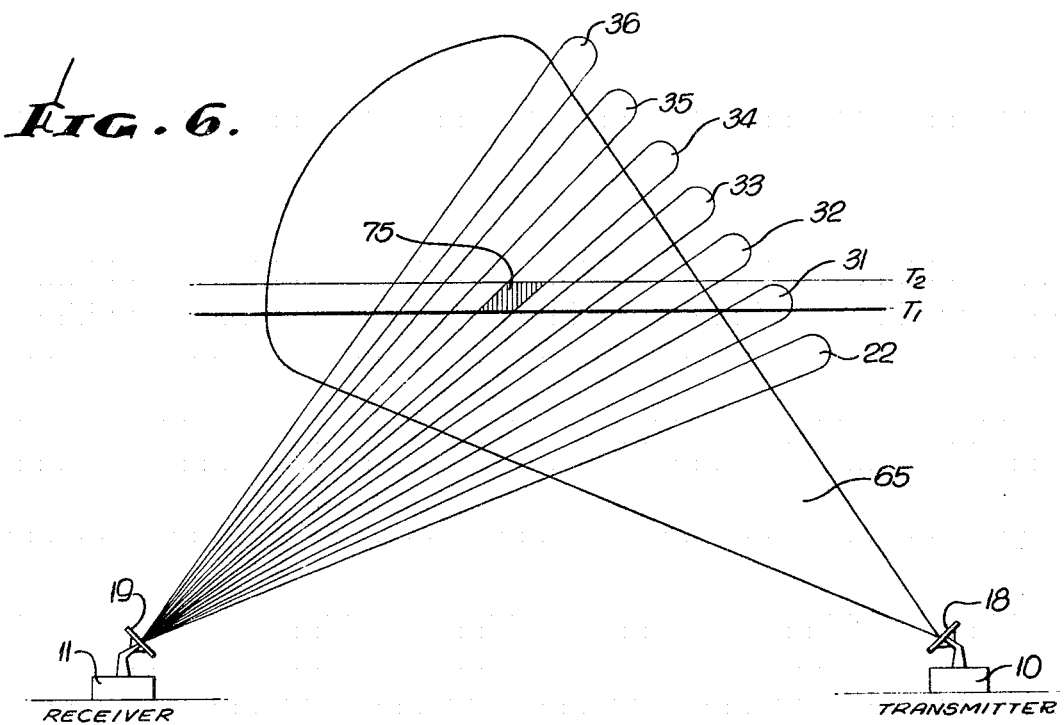
FIG. 6 is a view similar to that of FIG. 3 illustrating an alternative embodiment of the invention.

An alternative embodiment of the system is shown in FIGS. 6–10. A simpler approach to area coverage is possible when the source of scattering is relatively limited in spatial extent. The phased array can be replaced by a single broadbeam acoustic transducer in conjunction with a transmitted signal tailored to the localized vortex characteristics. Such a system is shown in FIG. 6 where the transmitter produces the single broad beam 65 which encompasses a length of the beam path of each of the receiver beams 22, 31–36. A preferred form of transmitter is shown in FIG. 7 and incorporates a signal generator 66, a modulator 67, a power amplifier 68, and an acoustic transducer 69. The transmitter output is pulsed by the modulator and a typical pulse pattern is shown in FIG. 8 with a short pulse 70 of duration T followed by a longer pulse 71, with the short pulse being used for spatial identification and the long pulse being used for vortex analysis.

The single broad transmitter beam illuminates the entire area to be covered by the system. The short pulse of length T, typically in the order of 20 milliseconds, is used to localize the vortex in space. If a return is observed in a particular receiver channel, for example the channel for beam 34, in the time period $T_1$ to $T_2$ after transmission (where $T_2 - T_1 = T$), then the vortex is identified as originating in the zone 75. The zone 75 is defined by the intersection of the particular receiver beam 34 and the ellipsoidal shell with the transmitter and receiver as foci. This ellipsoidal shell is approximately a horizontal slab for the usual system configuration and thus the elapsed time after transmission of the pulse 70 may be correlated with altitude above the position of the transmitter. In order to avoid spatial ambiguity, the pulse 70 should not be transmitted more frequently than once or twice per second. The longer pulse 71 provides the energy for illuminating the vortex to produce the scattering for the receiver with a pulse duration long enough to permit analysis of the velocity characteristics in the zone occupied by the vortex. The analysis is the same as that provided in the early embodiment and in the copending application.

The longer pulse 71 can be at the same frequency as the short pulse 70 and is delayed so as to allow the spatial information to be obtained first.

Figure 9:
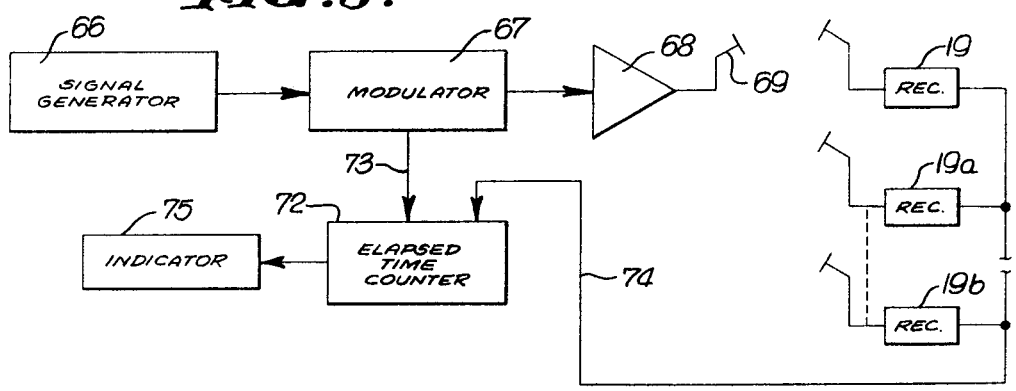
FIG. 9 is a block diagram of a single frequency system such as is illustrated in FIG. 6.

A system for measuring the time lapse between transmission of the short pulse 70 and the time an output signal is received from a receiver is shown in FIG. 9. An elapsed time counter 72 has a start input on line 73 and a stop input on line 74. A start signal is provided from the modulator 67 when the short pulse 70 is generated. A stop signal is provided from one of the receivers when an output signal indicating the presence of a vortex is received. The elapsed time between the two signals is counted and may be displayed at an indicator 75 in terms of time or in terms of amplitude or otherwise as desired.

Figure 10:
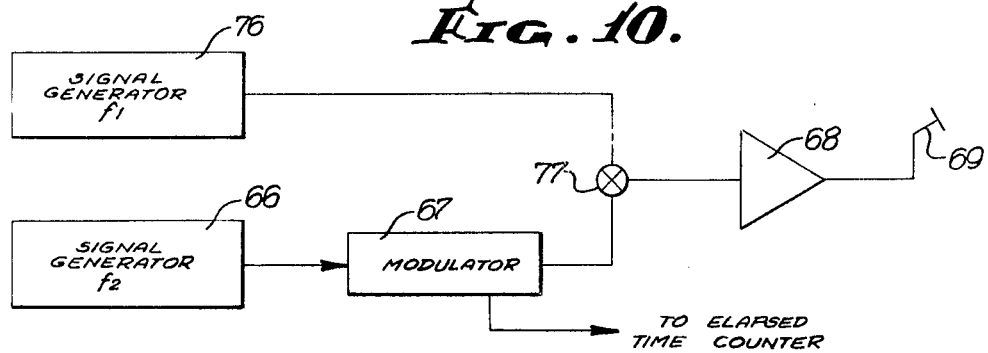
FIG. 10 is a block diagram of a dual frequency system such as is illustrated in FIG. 6.

In an alternative arrangement, the short pulse 70 may be transmitted periodically at one frequency $f_2$ and a continuous-wave signal may be transmitted at another frequency $f_1$, with the short pulse being used for spatial analysis and the continuous-wave signal used for velocity or vortex analysis. A typical transmitter configuration for this system is illustrated in FIG. 10, with signal generator 76 providing the continuous-wave signal which is combined with the pulse signal from modulator 67 at a summing junction 77, providing for transmission of both frequencies $f_1$ and $f_2$ at the same time.

As another alternative mode particularly suitable where very fine velocity resolution is not required and where the signal level is relatively high, a system as shown in FIG. 9 may be utilized with a single pulse of about 20 millisecond duration with the return from this pulse being used for both spatial identification and vortex velocity analysis.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In an aircraft vortex detection system incorporating an acoustic echo system with a transmitter for directing a beam of acoustic energy toward a zone, and a plurality of receivers and analyzers spaced from the transmitter for receiving acoustic energy of the transmitter scattered by a vortex in a zone and generating an output signal varying as a function of the magnitude of the scattering, the improvement wherein said transmitter includes an acoustic transducer system with a plurality of beams for directing energy to a plurality of adjacent beam paths, and control means for selectively energizing said beams.

2. A system as defined in claim 1 wherein said control means includes means for energizing said beams in sequence.

3. A system as defined in claim 1 wherein said control means includes means for energizing two of said beams at different frequencies.

4. A system as defined in claim 1 wherein said control means includes means for energizing said beams in groups of different frequencies, and energizing the beams of a group in sequence.

5. A system as defined in claim 2 wherein said transmitter acoustic transducer system comprises an M element array, and said control means includes a phased signal generator providing M sets of transmitter signals, with a gate for connecting each set to an element of the array, and a switching unit for selectively actuating gates to energize said transmitter beams in sequence.

6. In an aircraft vortex detection system incorporating an acoustic echo system with a transmitter for directing a beam of acoustic energy toward a zone, and a plurality of receivers and analyzers spaced from the transmitter for receiving acoustic energy of the transmitter scattered by a vortex in a zone and generating an output signal varying as a function of the magnitude of the scattering, the improvement wherein said transmitter includes an acoustic transducer system for directing energy over a broad beam path encompassing a length of the beam path of each of said receivers, and control means for energizing said transmitter beam in pulses, and including timing means having signals corresponding to a transmitted pulse and a received pulse as inputs for providing a spatial identification of the zone occupied by the vortex producing the received pulse.

7. A system as defined in claim 6 wherein said control means includes means for producing alternately short duration and long duration pulses, with said short duration pulses providing the transmitted pulse signal to said timing means.

8. A system as defined in claim 6 wherein said control means includes means for producing pulses of one frequency and a continuous output of another frequency.

9. A system as defined in claim 6 wherein said timing means includes means for measuring the time interval between transmitted pulse and received pulse, with said time interval varying as a function of the location of the vortex in the space illuminated by the transmitter beam.

10. In an aircraft vortex detection system incorporating an acoustic echo system with a transmitter for directing a beam of acoustic energy toward a zone, and a plurality of receivers and analyzers spaced from the transmitter for receiving acoustic energy of the transmitter scattered by a vortex in a zone and generating an output signal varying as a function of the magnitude of the scattering, the improvement wherein said transmitter includes an acoustic transducer system for directing energy over a broad area encompassing a length of the beam path of each of said receivers, and identification means for providing a spatial identification of the zone in said area occupied by the vortex producing an output signal at a specific receiver.

11. A system as defined in claim 10 wherein said acoustic transducer system provides a plurality of beams defining adjacent beam paths, and said identification means includes means for selectively energizing said transmitter beams.

12. A system as defined in claim 11 wherein said acoustic transducer system provides a single broad beam, and said identification means includes means for energizing said transmitter beam in pulses and means for measuring the time interval between a transmitted pulse and the received pulse providing the output signal.

* * * * *